(12) United States Patent
Peng et al.

(10) Patent No.: US 12,138,673 B2
(45) Date of Patent: Nov. 12, 2024

(54) ENDLESS ROLLING METHOD BASED ON TEMPERATURE UNIFORMITY CONTROL

(71) Applicant: Yanshan University, Qinhuangdao (CN)

(72) Inventors: Yan Peng, Qinhuangdao (CN); Caiyi Liu, Qinhuangdao (CN); Shicheng Liang, Qinhuangdao (CN); Shuo Guo, Qinhuangdao (CN)

(73) Assignee: Yanshan University, Qinhuandao (CN)

( * ) Notice: Subject to any disclaimer, the term of this patent is extended or adjusted under 35 U.S.C. 154(b) by 0 days.

(21) Appl. No.: 17/880,749

(22) Filed: Aug. 4, 2022

(65) Prior Publication Data

US 2023/0037730 A1 Feb. 9, 2023

(30) Foreign Application Priority Data

Aug. 9, 2021 (CN) .......................... 202110927292.3

(51) Int. Cl.
*B21B 1/46* (2006.01)
*B21B 1/22* (2006.01)
(Continued)

(52) U.S. Cl.
CPC ................ *B21B 1/463* (2013.01); *B21B 1/22* (2013.01); *B21B 37/74* (2013.01); *B21B 45/0203* (2013.01); *B21B 45/04* (2013.01)

(58) Field of Classification Search
CPC ................................ B21B 1/463; B21B 37/74
See application file for complete search history.

(56) References Cited

U.S. PATENT DOCUMENTS

2022/0072593 A1* 3/2022 Fujita ...................... C22C 33/00
2022/0193741 A1* 6/2022 Lengauer ................ B21B 1/026

FOREIGN PATENT DOCUMENTS

CN 101314811 A * 12/2008
CN 109647884 A * 4/2019
(Continued)

*Primary Examiner* — Kevin E Yoon
*Assistant Examiner* — Jacky Yuen
(74) *Attorney, Agent, or Firm* — IPRO, PLLC; Na Xu

(57) ABSTRACT

The invention provides an endless rolling method based on temperature uniformity control, and belongs to the field of iron and steel metallurgy. By optimizing the process path, a new layout mode is adopted, a double heat storage soaking furnace and a descaling box are additionally arranged, transverse and longitudinal bonding magnetic induction heating device is adopted, transverse and longitudinal temperature uniform of the slab in the rolling process is realized, the cross section temperature difference is reduced, and the product quality is improved. On the basis of five-stand arrangement of a traditional finish rolling mill, a rolling mill is additionally arranged to serve as a standby rolling mill, such that on-line non-shutdown change roller of the finish rolling mill is realized. The method of the invention realizes a full-continuous production of production and meets the high-quality development requirements of iron and steel metallurgy, such that traditional cool rolling can be replaced with hot rolling, traditional thick-specification strip can be replaced with high-added-value thin specification strip. There is important significance in the aspects of productivity optimization layout, green manufacturing, intelligent manufacturing and the like.

1 Claim, 4 Drawing Sheets

(51) Int. Cl.
*B21B 37/74* (2006.01)
*B21B 45/02* (2006.01)
*B21B 45/04* (2006.01)

(56) References Cited

FOREIGN PATENT DOCUMENTS

| | | | |
|---|---|---|---|
| CN | 111278182 A | * | 6/2020 |
| CN | 111872120 A | * | 11/2020 |
| JP | 2009263701 A | * | 11/2009 |

* cited by examiner

ENDLESS ROLLING METHOD BASED ON TEMPERATURE UNIFORMITY CONTROL

TECHNICAL FIELD

The invention relates to field of iron and steel metallurgy, in particular to a method for uniformly controlling temperature of a thin slab continuous casting and endless rolling technology.

BACKGROUND

A thin slab continuous casting and continuous rolling technology is an integrated steel manufacturing process by rigid connecting a series of traditional independent processes, such as heating, rough rolling, finish rolling and the like. For decades, driven by industry development of continuous manufacturing, short process, and near net shape, the thin slab continuous casting and rolling technology is developed from a first generation of single slab rolling, represented by CSP technology, to a second generation of semi-endless rolling, represented by FTSR technology, and recently, to a third generation of endless rolling, represented by ESP and MCCR technology etc. The endless rolling technology has advantages of short process, less equipment, less investment, quick response, short production cycle, energy saving, high yield and the like. Thin specification proportional strip can be stably produced to cover cool rolled product with the same specification in a large proportion, so as to realize that hot rolling replace cool rolling, and high-added-value thin specification hot-rolled strip replace a traditional thicker specification product. The endless rolling technology represents the highest level of the current-world hot-rolled strip steel technology.

Compared with traditional hot rolling technology, according to endless rolling technology, production line length is greatly shortened, at the same time, delivery mode of mass flow, energy flow and the like is also different from that of traditional hot rolling technology. In high-temperature deformation process of the slab, high temperature provides a temperature foundation for a smooth going of big deformation rolling, and rolling mill load can be reduced. A stable and uniform temperature field of the slab can lay foundation for stable rolling and improvement of production benefit.

In continuous rolling area, the most obvious development is introduction of an induction heating technology, such that production line length is greatly shortened, flexible and efficient heating mode is achieved, an intermediate slab is rapidly heated before entering finish rolling, therefore, best deforming temperature is provided to produce thin specification strip steel. Introduction of induction heating technology brings many advantages as well as defects. Induction heating process relates to multi-field coupling process of electric, magnetic, heat, force and microstructure transition, while heat transfer process is affected by electromagnetic field, so as to cause skin effect and edge effect. Process parameters, such as, shape and arrangement mode of the induction coil, distance between an induction coil and an intermediate slab, can also affect temperature field of the intermediate slab. For existing one-way magnetic flux heating technology, in 10-30 s' heating time, it is difficult to achieve uniform temperature field of the intermediate slab and it is easy to form a non-uniform temperature field, therefore, the quality of the final product is influenced.

SUMMARY

In order to solve the technical problem, the invention provides an endless rolling method based on temperature uniformity control. By reproducing the present rolling process, slab temperature uniformity and consistency precise control are achieved, surface quality of the slab is improved, and a rolling mill is additionally arranged as a standby rolling mill based on a five-stand arrangement of the ESP finish rolling mill such that on-line non-shutdown change roller of the finish rolling unit is realized. The process method has the characteristics of high efficiency, low cost, green manufacturing and the like.

The technical solution of the present invention is as follows:

Specifically, the present invention provides an endless rolling method based on temperature uniformity control, manufacturing of the slab comprises the following steps:

from a continuous casting, to a double regenerative soaking furnace, to a descaling box, to a rough rolling mill, to a pendulum shear, to an induction heating, to a descaling box, to a finish rolling mill, to a laminar cooling, to a flying shear and to a taking-up;

temperature of the slab is 1500° C. after the slab is treated by continuous casting, function of keeping a goal temperature is achieved after passing through the double regenerative soaking furnace, and temperature consistency and uniformity control in the furnace are achieved such that the temperature is 1300° C., then the temperature is reduced to 1250° C. after passing through the descaling box, the temperature is reduced to 1000±20° C. after the slab is rough rolled in high pressure by passing through the rough rolling mill, the temperature is increased to 1058±15° C. after being subjected to the induction heating, the temperature is reduced to 950±20° C. after the slab is finish rolled through passing through the finish rolling mill, the temperature is reduced to 650±20° C. after being subjected to the laminar cooling, and then the slab is taken up by the taking up;

the double regenerative soaking furnace comprises an upper double-burner nozzle and a lower double-burner nozzle, such that double-sided heating of the slab in the furnace is achieved by diffusing type burning of the double heat storage soaking furnace to reduce longitudinal temperature difference and cross section temperature difference of the slab, edge temperature defect of the slab is reduced, surface quality of the finished product plate is improved, the soaking furnace can be used as a cooling furnace at the same time, and when lower temperature is required by the rough rolling, the slab is not heated in the furnace, and natural cooling or heat preservation is conducted;

the induction heating adopts an induction heating arrangement of bonding a transverse magnetic field as front half section and a longitudinal magnetic field as rear half section, and the transverse magnetic field causes a relatively large temperature difference between central area and edge of the slab after heating, and surface temperature distribution uniformity is poor; the longitudinal magnetic field causes that a large thickness direction temperature difference of the slab is large, and core temperature distribution uniformity is poor; the temperature in the longitudinal magnetic field is uniform in a width direction, and the temperature in the transverse magnetic field is uniform in a thickness direction, the longitudinal magnetic field is arranged in front of the transverse magnetic field so as to improve initial rolling temperature, such that skin effect and edge effect can be avoided by induction heating arrangement of bonding the transverse magnetic field and the longitudinal magnetic field such that temperature difference between the thickness direction and the width direction of the slab is small, therefore transverse and longitudinal temperature uniformity of the slab before entering the finish rolling mill can be improved. Preferably, the slab is subjected to rough rolling by the rough rolling mill, is subjected to finish rolling by the finish rolling mill, such that microstructure of the slab is austenite, and then the slab is subjected to laminar cooling, such that the microstructure is converted into ferrite and pearlite.

Preferably, the slab is subjected to rough rolling by the rough rolling mill, is subjected to finish rolling by the finish rolling mill, such that microstructure of the slab is austenite, and then the slab is subjected to laminar cooling, such that the microstructure is converted into ferrite and pearlite.

Preferably, thickness of a non-head rolled strip steel is 0.8-10 mm.

Preferably, the descaling box is a small amount of water and large pressure descaling box.

Preferably, the standby stand is arranged in front of the finish rolling mill.

Compared with the prior art, the present invention has the following advantages:

(1) The double regenerative soaking furnace of the invention can heat upper surface and lower surface of the slab, ensure uniformity and consistency of the temperature of the slab in the soaking furnace, longitudinal temperature difference and cross section temperature difference of the slab is reduced, and the temperature of the slab before entering the rough rolling mill is ensured to be uniform.

(2) According to the transverse and longitudinal magnetic bonding induction heating device, the slab is uniformly heated, such that influence of the longitudinal magnetic thickness uneven temperature and transverse magnetic corner effect are avoided, and the temperature of the slab before entering the finish rolling mill is ensured to be uniform.

(3) a rolling mill is added in the finish rolling mill of the invention to serve as a standby stand, such that in working state, when a certain stand roller in a five-stand rolling mill is seriously worn, the standby stand is put into work, and the worn roller of the worn rolling mill is lifted and exited from the rolling production, and on-line non-shutdown change roller of the finish rolling mill is realized.

(4) According to the endless rolling production line temperature uniform control method provided by the invention, a new layout mode is adopted to add the double regenerative soaking furnace, the descaling box and the finish rolling mill, such that transverse and longitudinal temperature uniformity of the slab in the rolling process is achieved, cross section temperature difference is reduced, product quality is improved. Full-continuous production of production is realized, high-quality development requirements of iron and steel metallurgy is met, such that traditional cool rolling can be replaced with hot rolling, traditional thick-specification strip can be replaced with high-added-value thin specification strip. It has important significance in the aspects of productivity optimization layout, green manufacturing, intelligent manufacturing and the like.

DETAILED DESCRIPTION

Figure 1:
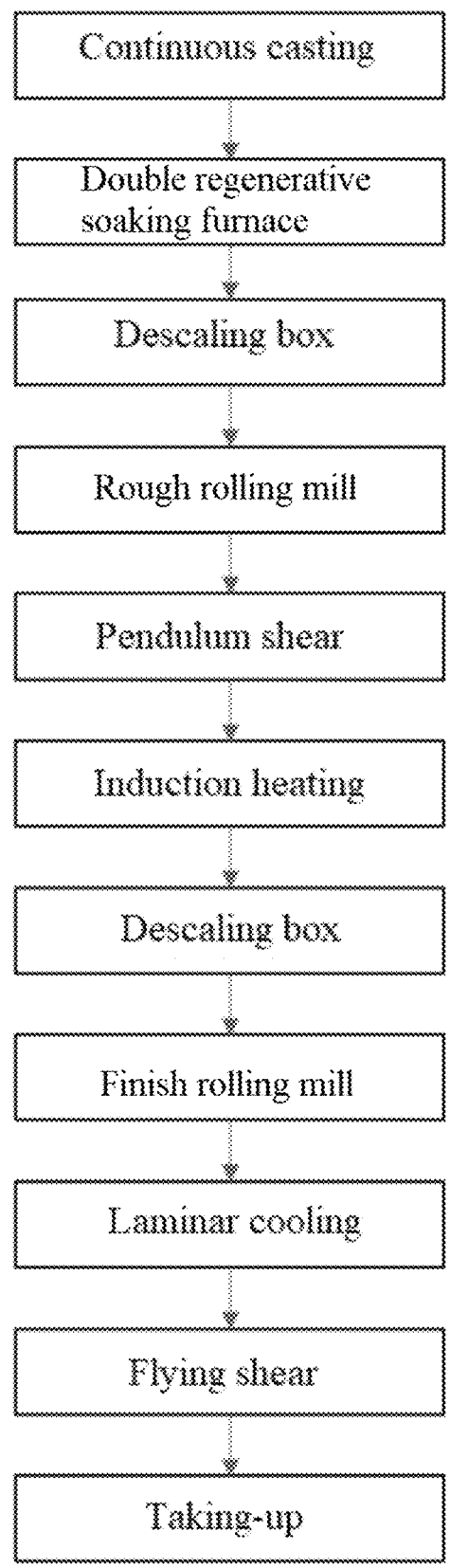
FIG. 1 is a process flow diagram of a endless rolling production line temperature uniformity control method according to the present invention.
Figure 2:
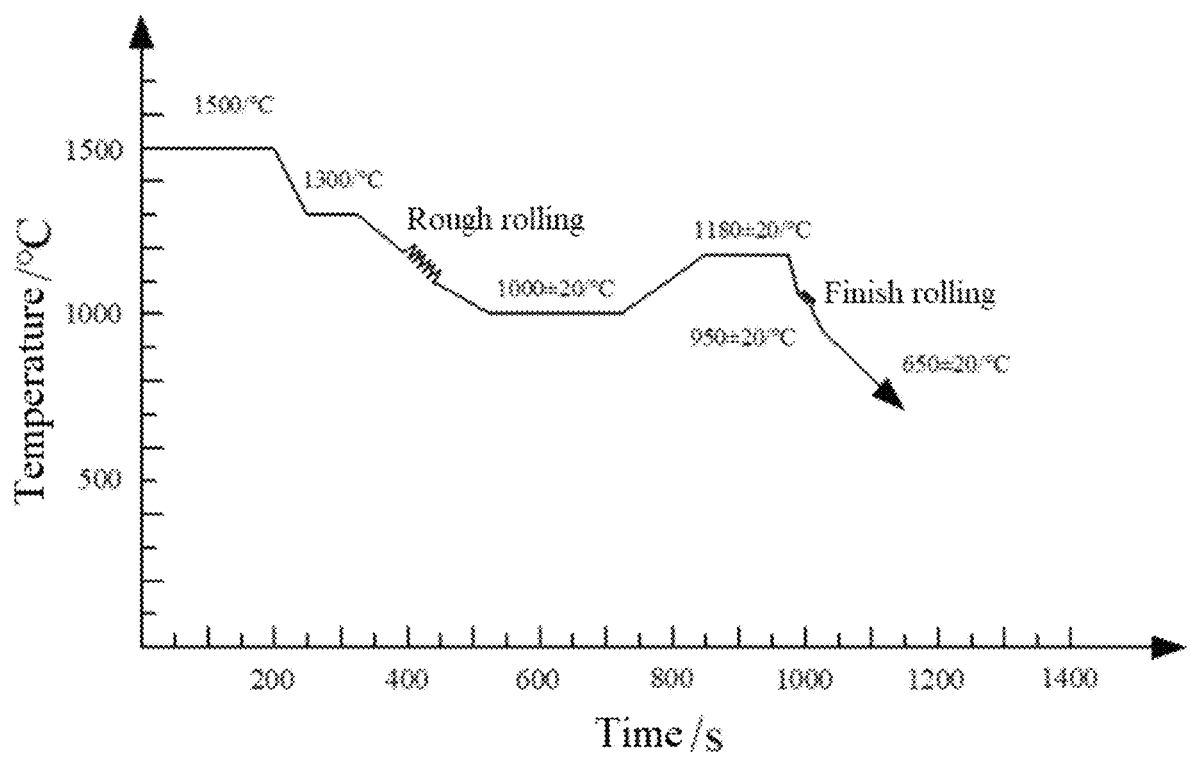
FIG. 2 is a process diagram of a temperature control method according to the present invention.

In the following, embodiments of the present invention will be described with reference to the accompanying drawings. The process flow diagram is shown in FIG. 1, and the temperature control method is as shown in FIG. 2.

Embodiment 1

In rolling process of this embodiment, temperature of the slab is 1500° C. after the slab is treated by the continuous casting, and the temperature of the slab is 1300° C. after the slab is treated by the double regenerative soaking furnace, wherein a upper and down double-burner device is arranged, such that double-sided heating of the slab is guaranteed, length temperature difference and cross section temperature difference of the slab are effectively reduced, edge temperature defect of the slab is solved, and surface quality of the finished plate is improved.

The temperature of the slab is reduced to 1250° C. after the slab is treated by the descaling box, which employs high pressure water to remove iron oxide skin existing on surface of the slab by virtue of the small amount of water and large pressure design structure, to improve quality of the slab.

The temperature of the slab is reduced to 980° C. after the slab is rough rolled through a rough rolling mill. The pendulum shear can shear head and tail of the slab when the finish rolling mill stops due to failure, such that segmented intermediate blank output by the rough rolling mill can be removed. A thin plate production mode is switched to a medium thickness plate production mode so as to achieve normal operation.

The temperature of the slab is increased to 1043° C. after the slab is treated by the induction heating, wherein the slab is uniformly heated by a transverse and longitudinal magnetic bonding induction heating arrangement, such that influence of uneven temperature in thickness direction of the longitudinal magnetic as well as edge and corner effect of the transverse magnetic is eliminated.

The temperature of the slab is reduced to 930° C. after the slab is treated by finish rolling through the finish rolling mill, and temperature of the slab is reduced to 630° C. after the slab is treated by the laminar cooling. The finish rolling mill adopts a six-stand arrangement, and when a certain stand roller in the five-stand rolling mill is seriously worn in working state, a '5+1' dynamic change procedure strategy is adopted, a standby stand is put into work, and the worn roller is lift and exited from the rolling production, such that on-line changing roller without shutdown is realized, and yield is guaranteed and production is all continuously carried out. After laminar cooling, microstructure is converted into ferrite and pearlite. The slab is sheared into a preset size through the flying shear, and finished product is finally taken-up by a coiler.

Through the above process, transverse and longitudinal temperature uniformity of the slab in the rolling process is realized, product quality is improved, and all continuously integrated production is achieved, such that a produced high-added-value thin specification slab can be widely applied to field of automobile industry and the like.

Embodiment 2

In a rolling process of this embodiment, temperature of a slab is 1500° C. after the slab is treated by continuous casting, and the temperature of the slab is 1300° C. after the slab is treated by the double regenerative soaking furnace, wherein a upper and down double-burner device is arranged, such that double-sided heating of the slab is guaranteed, length temperature difference and cross section temperature difference of the slab are effectively reduced, edge temperature defect of the slab is solved, and surface quality of the finished plate is improved.

The temperature of the slab is reduced to 1250° C. after the slab is treated by the descaling box, which employs high pressure water to remove iron oxide skin existing on surface of the slab by virtue of the small amount of water and large pressure design structure, to improve quality of the slab.

The temperature of the slab is reduced to 1000° C. after the slab is rough rolled through a rough rolling mill. The pendulum shear can shear head and tail of the slab when the finish rolling mill stops due to failure, such that segmented intermediate blank output by the rough rolling mill is removed. A thin plate production mode is switched to a medium-thickness plate production mode, and normal operation is achieved.

The temperature of the slab is increased to 1058° C. after the slab is treated by the induction heating, wherein the slab is uniformly heated by a transverse and longitudinal magnetic bonding induction heating arrangement, such that influence of uneven temperature in thickness direction of the longitudinal magnetic as well as edge and corner effect of the transverse magnetic is eliminated.

The temperature of the slab is reduced to 950° C. after the slab is treated by finish rolling through the finish rolling mill, and the temperature of the slab is reduced to 650° C. after the slab is treated by the laminar cooling. The finish rolling mill adopts a six-stand arrangement, and when a certain stand roller in the five-stand rolling mill is seriously worn in working state, a '5+1' dynamic change procedure strategy is adopted, a standby stand is put into work, and the worn roller is lift and exited from the rolling production, such that on-line changing roller without shutdown is realized, and yield is guaranteed and production is all continuously carried out. After the laminar cooling, microstructure is converted into ferrite and pearlite. The slab is sheared into a preset size by a flying shear, and finished product is finally taken-up by a coiler.

With above process, transverse and longitudinal temperature uniformity of the slab in the rolling process is realized, product quality is improved, and all continuously integrated production is achieved, such that a produced high-added-value thin specification slab can be widely applied to field of automobile industry and the like.

Embodiment 3

In a rolling process of this embodiment, temperature of a slab is 1500° C. after the slab is treated by continuous casting, and the temperature of the slab is 1300° C. after the slab is treated by the double regenerative soaking furnace, wherein a upper and down double-burner device is arranged, such that double-sided heating of the slab is guaranteed, length temperature difference and cross section temperature difference of the slab are effectively reduced, edge temperature defect of the slab is solved, and surface quality of the finished plate is improved.

The temperature of the slab is reduced to 1250° C. after the slab is treated by the descaling box, which employs high pressure water to remove iron oxide skin existing on surface of the slab by virtue of the small amount of water and large pressure design structure, to improve quality of the slab.

The temperature of the slab is reduced to 1020° C. after the slab is rough rolled through a rough rolling mill. A pendulum shear can shear head and tail of the slab when the finish rolling mill stops due to failure, such that segmented intermediate blank output by the rough rolling unit is removed. A thin plate production mode is switched to a medium-thickness plate production mode, and normal operation is achieved.

The temperature of the slab is increased to 1073° C. after the slab is treated by the induction heating, wherein the slab is uniformly heated by a transverse and longitudinal magnetic bonding induction heating arrangement, such that influence of uneven temperature in thickness direction of the longitudinal magnetic as well as edge and corner effect of the transverse magnetic is eliminated.

The temperature of the slab is reduced to 970° C. after the slab is treated by finish rolling through the finish rolling mill, and the temperature of the slab is reduced to 670° C. after the slab is treated by laminar cooling. The finish rolling mill adopts a six-stand arrangement, and when a certain stand roller in the five-stand rolling mill is seriously stand in working state, a '5+1' dynamic change procedure strategy is adopted, a standby stand is put into work, and the worn roller is lift and exited from the rolling production, such that on-line changing roller without shutdown is realized, and yield is guaranteed and production is all continuously carried out. After laminar cooling, microstructure is converted into ferrite and pearlite. The slab is sheared into a preset size by a flying shear, and a finished product is finally taken-up by a coiler.

Figure 3:
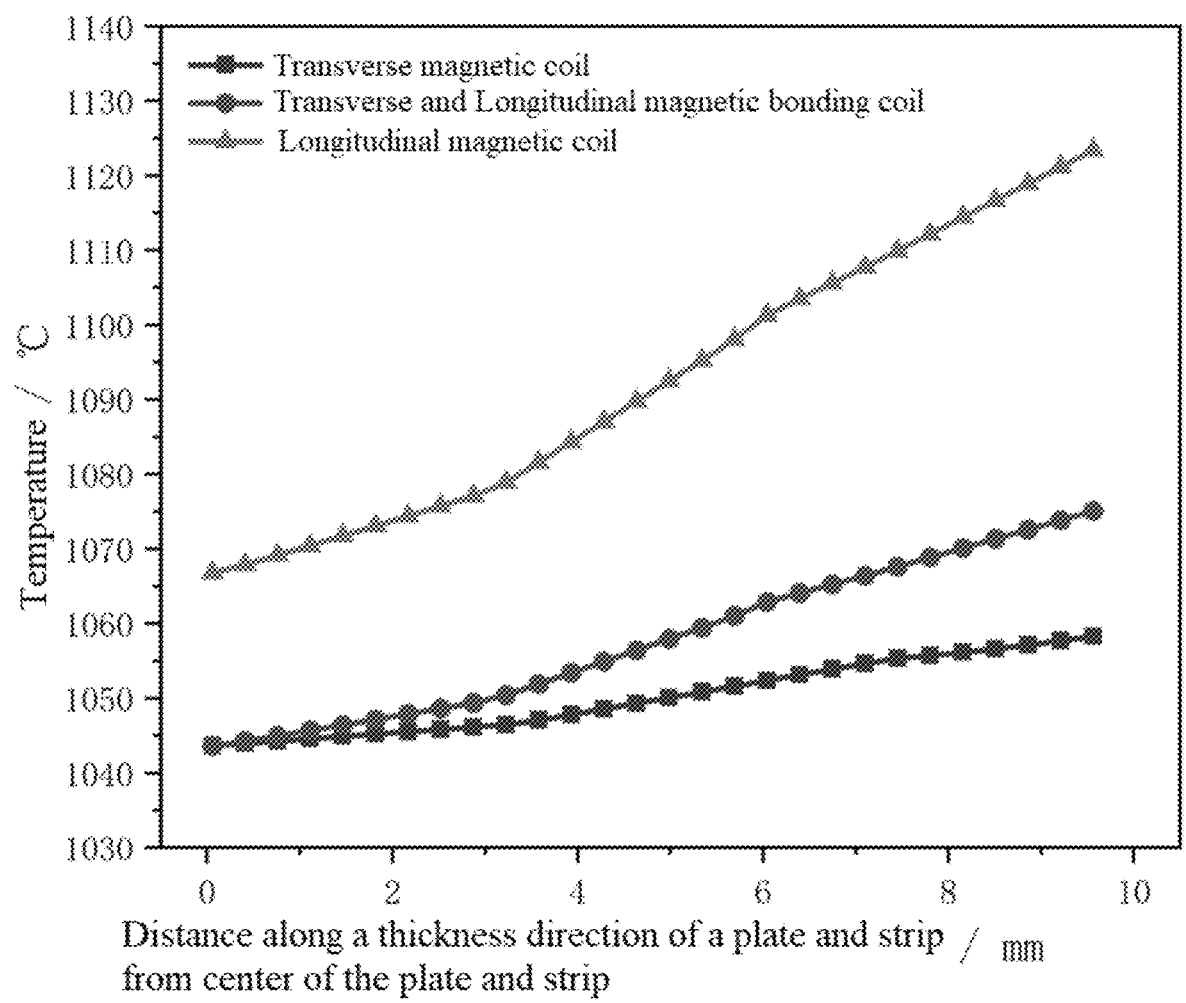
FIG. 3 is schematic diagrams of heating effect comparison of the transverse and longitudinal bonding coil and traditional induction heating in thickness direction according to the present invention.
Figure 4:
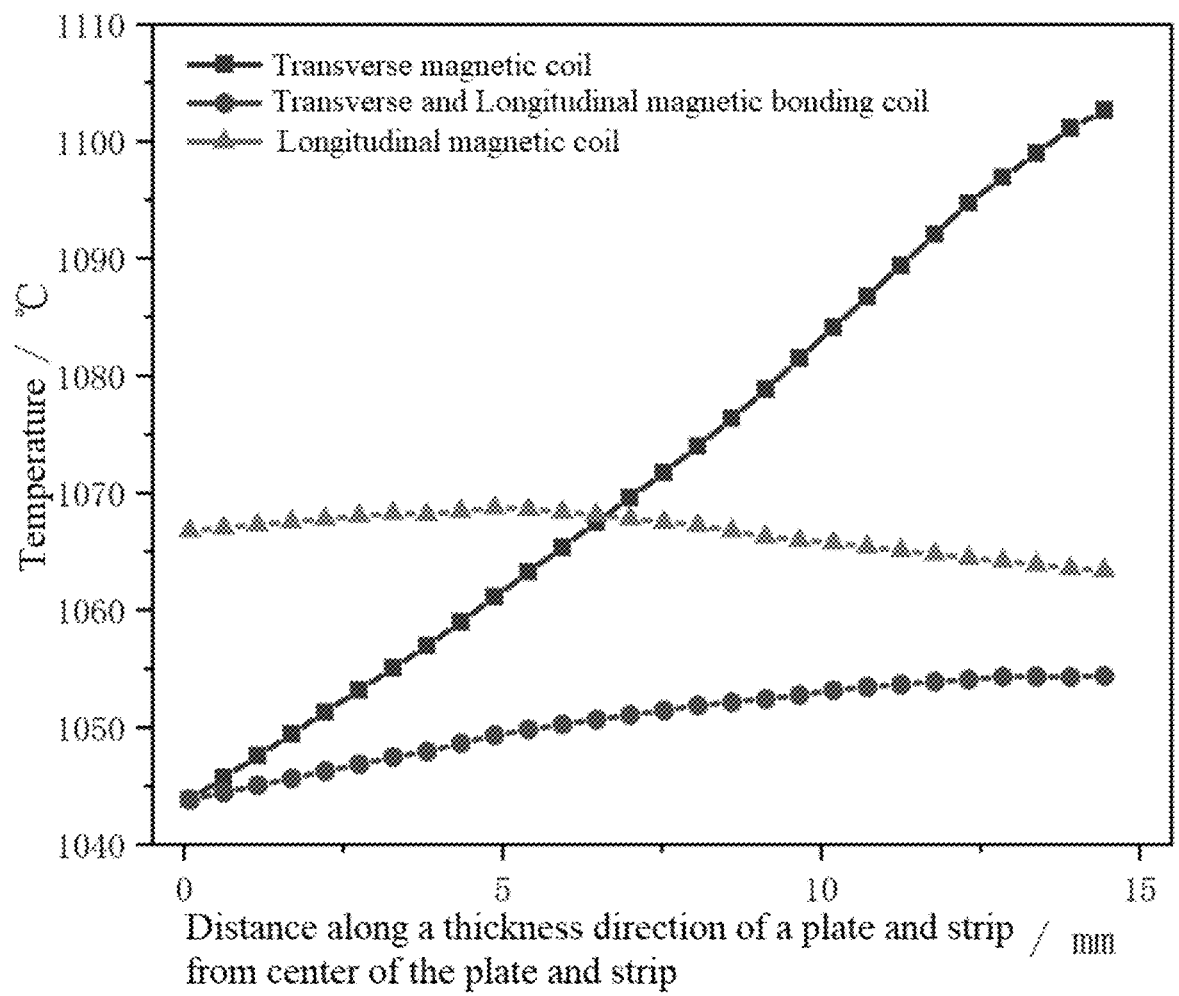
FIG. 4 is schematic diagrams of heating effect comparison of the transverse and longitudinal bonding coil and traditional induction heating in width direction according to the present invention.

FIG. 3 and FIG. 4 are schematic diagrams of heating effect comparison of the transverse and longitudinal bonding coil with traditional induction heating in thickness direction and width direction according to the embodiment 3 of the present invention respectively.

It can be seen from the figures that, the transverse magnetic field causes that temperature difference between center region of the strip steel and edge portion after heating is large, the highest temperature difference is 58.8° C., and surface temperature distribution uniformity is poor; the longitudinal magnetic field causes that thickness direction temperature difference of the plate and strip is large, the highest temperature difference is 54.4° C., core temperature distribution uniformity is poor; when the transverse and longitudinal bonding magnetic field heating is adopted, temperature difference between thickness direction and width direction of the plate and strip is small, and temperature difference is 30.2° C. and 10.5° C. respectively. The heating has better uniformity, such that the transverse and longitudinal temperature uniformity of the slab in the rolling process is realized, the product quality is improved, full-continuous integrated production is achieved, and the produced high-added-value thin specification plate and strip blank can be widely applied to the field of automobile industry and the like.

The above embodiments are only described for preferred embodiments of the present invention and are not intended to limit scope of the present invention, and various modifications and improvements made by a person of ordinary skill in the art without departing from the spirit of the present invention shall fall within scope of protection defined by claims of the present invention.

What is claimed is:

1. An endless rolling method based on temperature uniformity control is characterized in that manufacturing of a slab comprises following steps:

forming a slab at a temperature of 1500° C. by continuously casting, passing the slab through a double regenerative soaking furnace, wherein temperature consistency and uniformity control are achieved and a temperature of the slab is 1300° C., descaling the slab in a descaling box wherein the temperature is reduced to 1250° C., rough rolling the slab with high pressure by passing through a rough rolling mill, wherein the temperature of the slab is reduced to 1000±20° C., passing the slab through an induction heating arrangement to increase the temperature to 1058±15° C., finish rolling the slab by passing through a finish rolling mill, wherein the temperature of the slab is reduced to 950±20° C., passing the slab through a laminar cooling device to reduce the temperature to 650±20° C., and taking-up the slab by a coiler;

wherein the double regenerative soaking furnace comprises an upper double-burner nozzle and a lower double-burner nozzle, such that double-sided heating of the slab in the furnace is achieved by diffusing type burning of the double regenerative soaking furnace to reduce longitudinal temperature difference and cross section temperature difference of the slab, edge temperature defect of the slab is reduced, surface quality of a finished product plate is improved;

wherein the furnace can be used as a cooling furnace, and when lower temperature is required by the rough rolling, the slab is not heated in the furnace, and natural cooling or heat preservation is conducted;

wherein the induction heating arrangement of bonding a transverse magnetic field and a longitudinal magnetic field is adopted to perform induction heating, and the transverse magnetic field causes a temperature difference between a central area and an edge of the slab after heating; the longitudinal magnetic field causes a large-temperature difference in a thickness direction of the slab; the temperature in the longitudinal magnetic field is uniform in the width direction, and the temperature in the transverse magnetic field is uniform in the thickness direction, the longitudinal magnetic field is arranged in front of the transverse magnetic field so as to improve initial rolling temperature, and skin effect and edge effect can be avoided by induction heating arrangement of bonding the transverse magnetic field and the longitudinal magnetic field such that temperature difference between thickness direction and width direction of the slab is reduced, therefore transverse and longitudinal temperature uniformity of the slab before entering the finish rolling mill can be improved;

wherein the finish rolling mill is provided to serve as a standby stand, such that in working state, when a certain rack roller in a five-stand rolling mill is worn, the standby stand is put into work, and the worn roller of the worn rolling mill is lifted and exited from a rolling production, and on-line non-shutdown change roller of the finish rolling mill is realized;

wherein the slab is subjected to rough rolling through the rough rolling mill, is subjected to finish rolling through the finish rolling mill, such that microstructure of the slab is austenite, and then the slab is subjected to laminar cooling, such that the microstructure is converted into ferrite and pearlite.

* * * * *